United States Patent [19]
DiCosmo et al.

[11] Patent Number: 5,748,721
[45] Date of Patent: May 5, 1998

[54] HANDICAP TELEPHONE WITH ASSOCIATED BOOTH

[76] Inventors: Bob S. DiCosmo, 894 New Haven Rd., Navgatuck, Conn. 06770; Gary R. Tyszkiewicz

[21] Appl. No.: 705,949

[22] Filed: Aug. 30, 1996

[51] Int. Cl.⁶ .................................................. H04M 17/00
[52] U.S. Cl. .......................... 379/155; 379/150; 379/143; 379/454
[58] Field of Search ..................... 379/153, 155, 379/419, 420, 428, 430, 431, 434, 437, 446, 453, 454; 312/223.4; 52/27.5; D14/138, 142

[56] References Cited

U.S. PATENT DOCUMENTS

| | | |
|---|---|---|
| D. 320,205 | 9/1991 | Martinez .................. D14/146 |
| D. 338,352 | 8/1993 | Dooley et al. ............. D6/421 |
| 4,254,308 | 3/1981 | Blomeyer et al. |
| 4,568,803 | 2/1986 | Frola ........................ 179/183 |
| 5,555,296 | 9/1996 | McCloskey ............... 379/155 |

*Primary Examiner*—Curtis Kuntz
*Assistant Examiner*—Binh K. Tieu

[57] ABSTRACT

A handicap telephone including a phone housing having a pair of speakers situated distant therefrom for emitting audio signals; and a phone panel positioned on the phone housing including a numeric keypad for allowing a user to dial a specific phone number, a speaker for allowing the input of audio signals, and an on/off button situated on the bottom face, whereby upon the depression of the on/off button, a user may dial a telephone number on the keypad and further communicate with a second party without the use of hands.

6 Claims, 3 Drawing Sheets

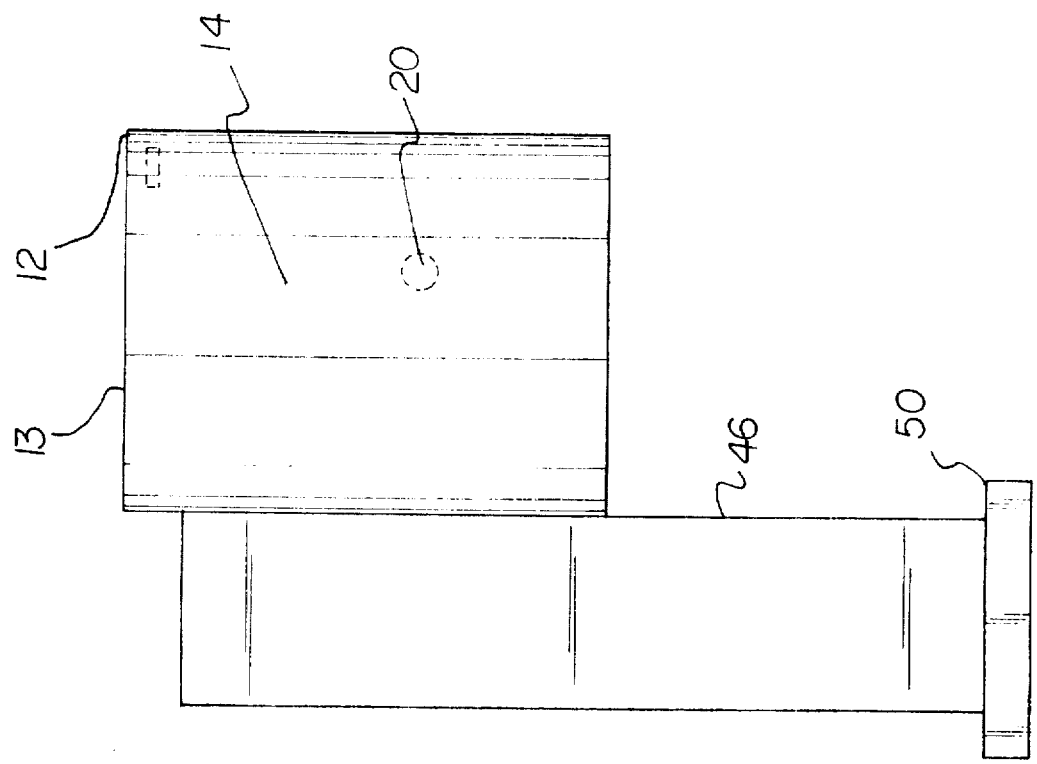
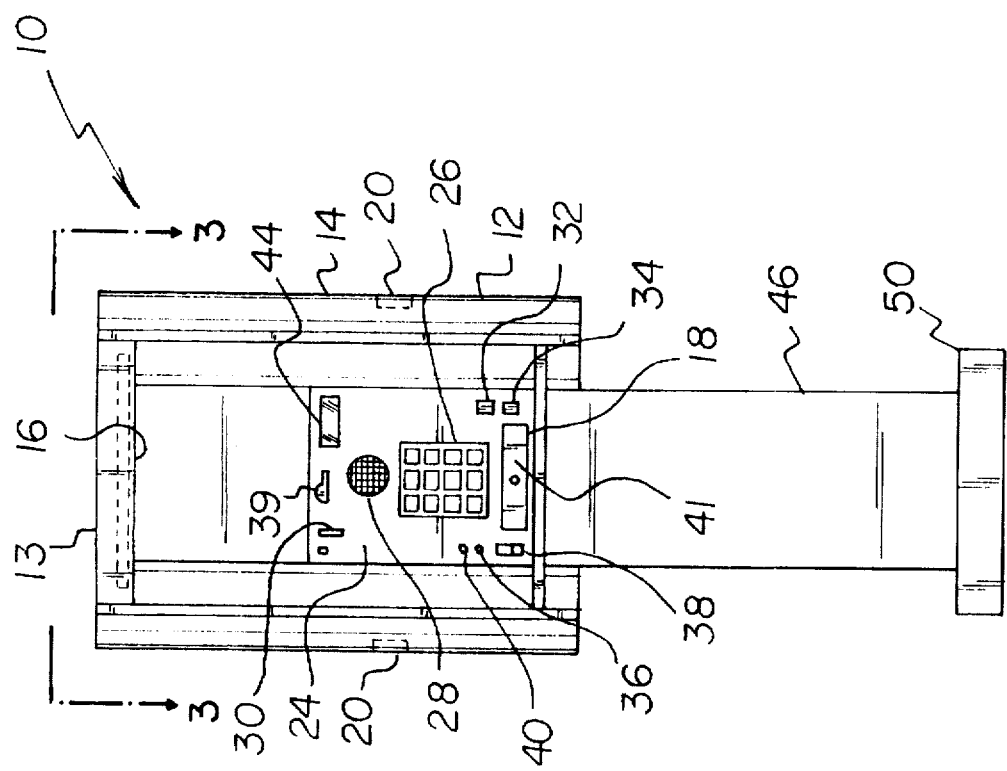

HANDICAP TELEPHONE WITH ASSOCIATED BOOTH

BACKGROUND OF THE INVENTION

1. Field of the invention

The present invention relates to a handicap telephone with associated booth and more particularly pertains to affording convenient usage of a telephone by a handicap person and further precluding vandalism.

2. Description of the Prior Art

The use of telephone booths is known in the prior art. More specifically, telephone booths heretofore devised and utilized for the purpose of allowing the use of a telephone in public are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,301,229 to Raynor; U.S. Pat. No. 4,453,043 to Zielinski et al.; U.S. Pat. No. 5,384,843 to Masuda et al.; U.S. Pat. No. 4,254,308 to Blomeyer et al.; U.S. Pat. No. 5,398,281 to Kurokawa et al.; and U.S. Pat. No. Des. 350,747 to McClendon are provided as being of general interest.

In this respect, the handicap telephone with associated booth according to the present invention substantially departs from the conventional concepts and designs of the prior art, and in so doing provides an apparatus primarily developed for the purpose of affording convenient usage of a telephone by a handicap person and further precluding vandalism.

Therefore, it can be appreciated that there exists a continuing need for a new and improved handicap telephone with associated booth which can be used for affording convenient usage of a telephone by a handicap person and further precluding vandalism. In this regard, the present invention substantially fulfills this need.

SUMMARY OF THE INVENTION

In view of the foregoing disadvantages inherent in the known types of telephone booths now present in the prior art, the present invention provides an improved handicap telephone with associated booth. As such, the general purpose of the present invention, which will be described subsequently in greater detail, is to provide a new and improved handicap telephone with associated booth which has all the advantages of the prior art and none of the disadvantages.

To attain this, the present invention essentially comprises a phone housing having an open horizontally situated generally oval bottom face, a closed horizontally situated generally oval top face, and a periphery formed therebetween with an open front face, a closed generally planar rear face, and a pair of arcuate closed side faces formed therebetween thus defining an interior space, the phone housing further including a light situated on a lower side of the top face for illuminating the interior space, a horizontal shelf coupled to the rear face adjacent the open bottom face and extended outwardly therefrom, a pair of speakers centrally situated on the side face faces within the interior space for emitting audio signals therefrom, and a coupling extension formed on an outer side of the rear face with an aperture formed therein; a phone panel positioned within the interior space on the rear face of the phone housing adjacent the bottom face thereof with a top edge, a bottom edge, and a pair of side edges connecting the top edge and bottom edge, the phone panel including a numeric keypad for allowing a user to dial a specific phone number, a speaker situated above the keypad for allowing the input of audio signals, a coin mechanism situated adjacent the top edge thereof for negotiating payment for a telephone call, an elevating button situated adjacent the bottom edge thereof adapted to transmit an elevating signal upon the depression thereof, a descending button also situated adjacent the bottom edge thereof for transmitting a descending signal upon the depression thereof, and an on/off button situated on the bottom face, whereby upon the depression of the on/off button in combination with the negotiation of payment, a user may dial a telephone number on the keypad and further communicate with a second party without the use of hands; and a vertical support having a front face, a rear face, a top face, a bottom face, and a pair of side faces formed therebetween thus defining an inner space, the front face having a vertical slot formed therein for allowing the coupling extension of the phone housing to be moved therein along a vertical axis, the vertical support further including a base plate formed on the bottom face thereof for allowing the main support to stand upright, a counterweight housing formed within the inner space on the rear face thereof with an aperture formed in an upper portion thereof, a counterweight located within the counterweight housing and adapted to be vertically maneuvered therein, a pulley motor situated within the inner space on one of the side faces and electrically connected to the elevating button and the descending button with the pulley motor having an associated horizontally orientated rotor with a pulley axially coupled thereto, and a pulley cable situated about the pulley having a first end fed through the aperture of the counterweight housing and connected to the counterweight and second end connected to the coupling extension, whereby the pulley motor is adapted to raise the phone housing upon the receipt of the elevating signal and further lower the phone housing upon the receipt of the descending signal.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved handicap telephone with associated booth which has all the advantages of the prior art telephone booths and none of the disadvantages.

It is another object of the present invention to provide a new and improved handicap telephone with associated booth which may be easily and efficiently manufactured and marketed.

It is a further object of the present invention to provide a new and improved handicap telephone with associated booth which is of a durable and reliable construction.

An even further object of the present invention is to provide a new and improved handicap telephone with associated booth which is susceptible of a low cost of manufacture with regard to both materials and labor, and which accordingly is then susceptible of low prices of sale to the consuming public, thereby making such handicap telephone with associated booth economically available to the buying public.

Still yet another object of the present invention is to provide a new and improved handicap telephone with associated booth which provides in the apparatuses and methods of the prior art some of the advantages thereof, while simultaneously overcoming some of the disadvantages normally associated therewith.

Still another object of the present invention is to afford convenient usage of a telephone by a handicap person and further preclude vandalism.

Lastly, it is an object of the present invention to provide a new and improved handicap telephone including a phone housing having a pair of speakers situated distant therefrom for emitting audio signals; and a phone panel positioned on the phone housing including a numeric keypad for allowing a user to dial a specific phone number, a speaker for allowing the input of audio signals, and an on/off button situated on the bottom face, whereby upon the depression of the on/off button, a user may dial a telephone number on the keypad and further communicate with a second party without the use of hands.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an illustration of the preferred embodiment of the handicap telephone with associated booth constructed in accordance with the principles of the present invention.

FIG. 2 is a plan side view of the present invention.

Similar reference characters refer to similar parts throughout the several views of the drawings.

DESCRIPTION OF THE PREFERRED EMBODIMENT

Figure 3:
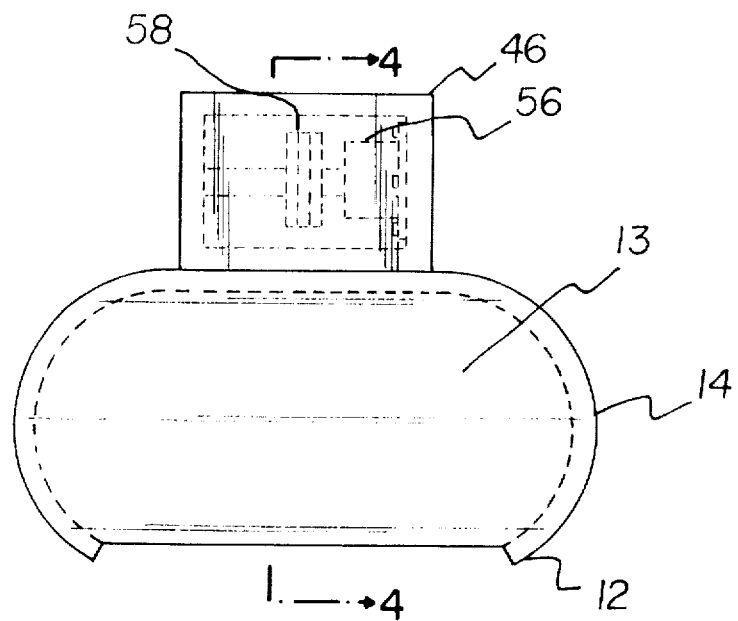
FIG. 3 is a top elevational view of the present invention.

With reference now to the drawings, and in particular to FIG. 1 thereof, a new and improved handicap telephone with associated booth embodying the principles and concepts of the present invention and generally designated by the reference numeral 10 will be described.

The present invention, the new and improved handicap telephone with associated booth, is comprised of a plurality of components. Such components in their broadest context include a phone housing, a phone panel, and a vertical support. Such components are individually configured and correlated with respect to each other so as to attain the desired objective.

Figure 4:
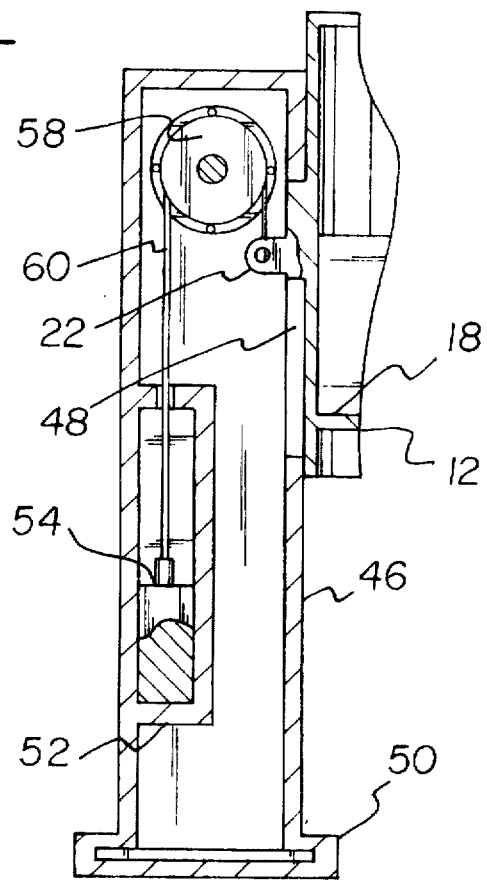
FIG. 4 is a cross-sectional view of the vertical support of the present invention taken along line 4—4 shown in FIG. 3.

More specifically, it will be noted that the system 10 of the present invention includes a phone housing 12. The phone housing has an open horizontally situated generally oval bottom face and a closed horizontally situated generally oval top face 13. Formed between the bottom face and the top face is a periphery 14 with an open front face, a closed generally planar rear face, and a pair of arcuate closed side faces formed therebetween. An interior space is thereby defined. The phone housing further includes a light 16 situated on a lower side of the top face for illuminating the interior space. A horizontal shelf 18 is coupled to the rear face adjacent the open bottom face and extended outwardly therefrom. For emitting audio signals therefrom, a pair of speakers 20 are each centrally situated on a respective side face within the interior space. Also, as shown in FIG. 4, a coupling extension 22 is formed on an outer side of the rear face with an aperture formed therein. To identify the present invention as a handicap telephone, handicap indicia is preferably imprinted on outer surfaces of the phone housing.

Further provided is a phone panel 24 positioned within the interior space on the rear face of the phone housing adjacent the bottom face thereof. The phone panel has a top edge, a bottom edge, and a pair of side edges connecting the top edge and bottom edge. The phone panel includes a numeric keypad 26 for allowing a user to dial a specific phone number. A speaker 28 is situated above the keypad for allowing the input of audio signals. For negotiating payment for a telephone call, a coin mechanism 30 is situated adjacent the top edge of the phone panel. Such coin mechanism is conventional in design. Also included is an elevating button 32 situated adjacent the bottom edge of the phone panel. The elevating button is adapted to transmit an elevating signal upon the depression thereof. A descending button 34 is also situated adjacent the bottom edge of the phone panel for transmitting a descending signal upon the depression thereof. An on/off button 36 is situated on the bottom face. In use, upon the depression of the on/off button in combination with the negotiation of payment, a user may dial a telephone number on the keypad and further communicate with a second party without the use of hands. It should be noted that the use of the speakers in the present invention avoid widespread vandalism associated with hand-held receivers. As an option, the phone panel may be further adapted to be voice-activated. Upon the receipt of a specified audio signal, the phone panel automatically dials an emergency number and further defers payment.

As shown in FIG. 1, a coin release mechanism 39 is included for allowing a user to negotiate payment in a conventional manner. A money box 41 is included for allowing the telephone to store negotiated monies. It should be noted that the money box is made accessible only to authorized personnel.

In addition, the phone panel may further include a volume control mechanism 38 adapted to allow the user to adjust the volume of the audio signals which are transmitted from the speakers. Also, a headphone jack 40 may be also situated on the phone panel. Such jack is adapted to allow the utilization of headphones in lieu of the speakers. To facilitate operation of the present invention, instructions 44 are imprinted on the phone panel. Other conventional options such as a mute button and a redial button may also be included.

Finally, as best shown in FIG. 4, a vertical support 46 is included having a front face, a rear face, a top face, a bottom face, and a pair of side faces formed therebetween thus defining an inner space. The front face has a vertical slot 48 formed therein for allowing the coupling extension of the phone housing to be moved therein along a vertical axis. The phone housing and vertical support, in combination, preferably have a height of approximately 6 feet and 6 inches. The vertical support further includes a base plate 50 formed on the bottom face thereof for allowing the main support to stand upright. Formed within the inner space on the rear face of the vertical support is a counterweight housing 52 with an aperture formed in an upper portion thereof. A counterweight 54 is located within the counterweight housing and adapted to be vertically maneuvered therein. Further provided is a pulley motor 56 situated within the inner space on one of the side faces and electrically connected to the elevating button and the descending button. The pulley motor has an associated horizontally orientated rotor with a pulley 58 axially coupled thereto. A pulley cable 60 is situated about the pulley having a first end fed through the aperture of the counterweight housing and connected to the counterweight and second end connected to the coupling extension. As such, the pulley motor is adapted to raise the phone housing upon the receipt of the elevating signal and further lower the phone housing upon the receipt of the descending signal.

Figure 6:
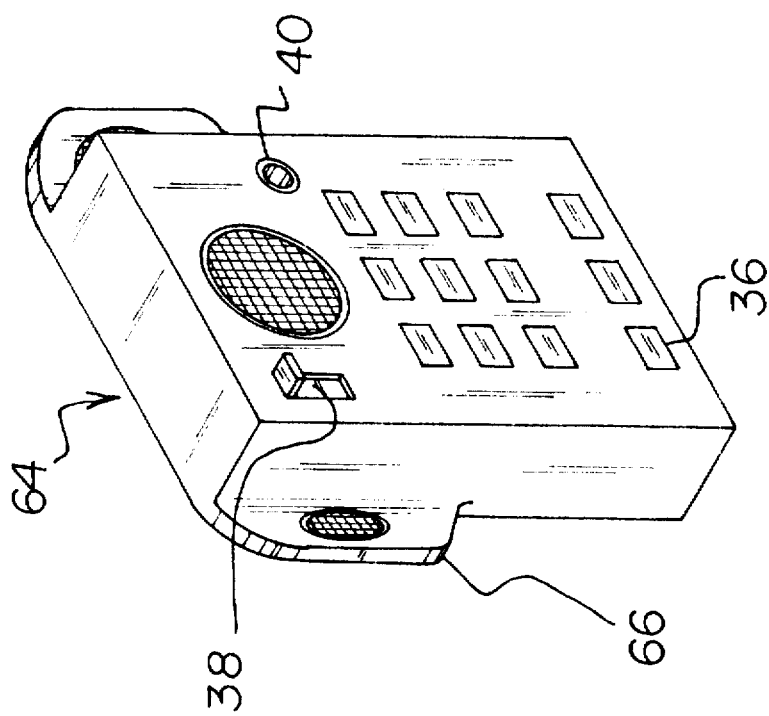
FIG. 6 is a perspective illustration of yet another alternate embodiment of the present invention excluding the vertical support and phone housing.
Figure 5:
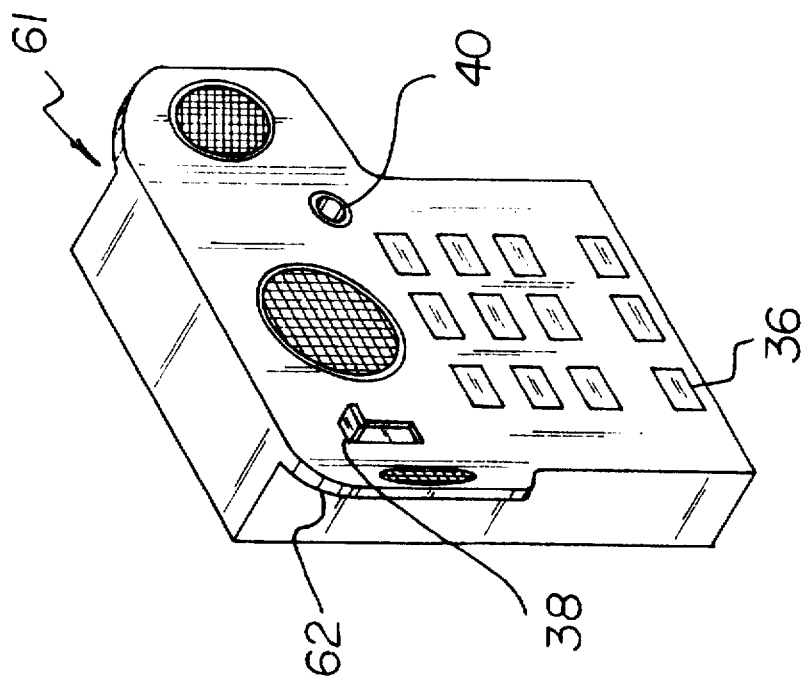
FIG. 5 is a perspective illustration of an alternate embodiment of the present invention excluding the vertical support and phone housing.

Alternatively, as shown in FIGS. 5 & 6, the vertical support is excluded and the phone panel merely resides alone without the aforementioned phone housing. The elevating button, descending button, and the coin mechanism is also excluded. A handicap telephone for home use is thus provided. Additionally, in an alternate embodiment 61, the speakers of the phone housing are situated on outwardly extending lips 62, wherein the lips are formed flush with a front face of the housing. Such model is ideal for being situated on a desk, counter, or the like. In yet another alternate embodiment 64, the speakers of the phone housing are situated on outwardly extending lips 66, wherein the lips are formed flush with a rear face of the housing. This embodiment is adapted to be mounted on wall.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved handicap telephone with associated booth comprising, in combination:

a phone housing having an open horizontally situated generally oval bottom face, a closed horizontally situated generally oval top face, and a periphery formed therebetween with an open front face, a closed generally planar rear face, and a pair of arcuate closed side faces formed therebetween thus defining an interior space, the phone housing further including a light situated on a lower side of the top face for illuminating the interior space, a horizontal shelf coupled to the rear face adjacent the open bottom face and extended outwardly therefrom, a pair of speakers centrally situated on the side face faces within the interior space for emitting audio signals therefrom, and a coupling extension formed on an outer side of the rear face with an aperture formed therein;

a phone panel positioned within the interior space on the rear face of the phone housing adjacent the bottom face thereof with a top edge, a bottom edge, and a pair of side edges connecting the top edge and bottom edge, the phone panel including a numeric keypad for allowing a user to dial a specific phone number, a speaker situated above the keypad for allowing the input of audio signals, a coin mechanism situated adjacent the top edge thereof for negotiating payment for a telephone call, an elevating button situated adjacent the bottom edge thereof adapted to transmit an elevating signal upon the depression thereof, a descending button also situated adjacent the bottom edge thereof for transmitting a descending signal upon the depression thereof, and an on/off button situated on the bottom face, whereby upon the depression of the on/off button in combination with the negotiation of payment, a user may dial a telephone number on the keypad and further communicate with a second party without the use of hands; and a vertical support having a front face, a rear face, a top face, a bottom face, and a pair of side faces formed therebetween thus defining an inner space, the front face having a vertical slot formed therein for allowing the coupling extension of the phone housing to be moved therein along a vertical axis, the vertical support further including a base plate formed on the bottom face thereof for allowing the main support to stand upright, a counterweight housing formed within the inner space on the rear face thereof with an aperture formed in an upper portion thereof, a counterweight located within the counterweight housing and adapted to be vertically maneuvered therein, a pulley motor situated within the inner space on one of the side faces and electrically connected to the elevating button and the descending button with the pulley motor having an associated horizontally orientated rotor with a pulley axially coupled thereto, and a pulley cable situated about the pulley having a first end fed through the aperture of the counterweight housing and connected to the counterweight and second end connected to the coupling extension, whereby the pulley motor is adapted to raise the phone housing upon the receipt of the elevating signal and further lower the phone housing upon the receipt of the descending signal.

2. A handicap telephone comprising:

a phone housing having a pair of speakers situated distant therefrom for emitting audio signals; and a phone panel positioned on the phone housing including a numeric keypad for allowing a user to dial a specific phone number, a speaker for allowing the input of audio signals, and an on/off button situated on the bottom face, whereby upon the depression of the on/off button, a user may dial a telephone number on the keypad and further communicate with a second party without the use of hands;

wherein the phone housing is adapted to be selectively maneuvered along a vertical axis via a pulley motor;

wherein the phone housing includes a coupling extension formed on an outer side of the rear face with an aperture formed therein; the phone panel includes an elevating button adapted to transmit an elevating signal upon the depression thereof and a descending button for transmitting a descending signal upon the depression thereof; and further including a vertical support having a front face, a rear face, a top face, a bottom face, and a pair of side faces formed therebetween thus defining an inner space, the front face having a vertical slot formed therein for allowing the coupling extension of the phone housing to be moved therein along a vertical axis, the vertical support further including a base plate formed on the bottom face thereof for allowing the main support to stand upright, a counterweight housing formed within the inner space on the rear face thereof with an aperture formed in an upper portion thereof, a counterweight located within the counterweight housing adapted to be vertically maneuvered therein, a pulley motor situated within the inner space on one of the side faces and electrically connected to the elevating button and the descending button with the pulley motor having an associated horizontally orientated rotor with a pulley axially coupled thereto, and a pulley cable situated about the pulley having a first end fed through the aperture of the counterweight housing and connected to the counterweight and second end connected to the coupling extension, whereby the pulley motor is adapted to raise the phone housing upon the receipt of the elevating signal and further lower the phone housing upon the receipt of the descending signal.

3. A handicap telephone as set forth in claim 2 wherein the phone housing further includes a horizontal shelf extending outwardly therefrom.

4. A handicap telephone as set forth in claim 2 wherein the phone housing includes an open horizontally situated generally oval bottom face, a closed horizontally situated generally oval top face, and a periphery formed therebetween with an open front face, a closed generally planar rear face, and a pair of arcuate closed side faces formed therebetween thus defining an interior space.

5. A handicap telephone as set forth in claim 2 wherein the phone housing further includes a light for illuminating purposes.

6. A handicap telephone as set forth in claim 2 wherein the phone panel includes a coin mechanism situated adjacent a top edge thereof for negotiating payment for a telephone call.

* * * * *